(12) United States Patent
Minegishi et al.

(10) Patent No.: US 10,713,511 B2
(45) Date of Patent: Jul. 14, 2020

(54) METHOD AND DEVICE FOR ESTIMATING RECOGNITION TIMING

(71) Applicant: Mazda Motor Corporation, Aki-gun, Hiroshima (JP)

(72) Inventors: Yuka Minegishi, Hatsukaichi (JP); Keiichi Tomii, Hiroshima (JP); Yasutaka Kajiwara, Hiroshima (JP); Takahiro Tochioka, Higashihiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 84 days.

(21) Appl. No.: 16/192,557

(22) Filed: Nov. 15, 2018

(65) Prior Publication Data

US 2019/0147276 A1 May 16, 2019

(30) Foreign Application Priority Data

Nov. 16, 2017 (JP) .................................. 2017-220578

(51) Int. Cl.
| | |
|---|---|
| *G06K 9/00* | (2006.01) |
| *B60W 40/09* | (2012.01) |
| *G01C 21/34* | (2006.01) |
| *G01C 21/36* | (2006.01) |

(52) U.S. Cl.
CPC ......... *G06K 9/00845* (2013.01); *B60W 40/09* (2013.01); *G01C 21/3484* (2013.01); *G01C 21/3655* (2013.01)

(58) Field of Classification Search
None
See application file for complete search history.

(56) References Cited

U.S. PATENT DOCUMENTS

| | | |
|---|---|---|
| 9,925,872 B1 | 3/2018 | Alasry et al. |
| 2010/0268453 A1 | 10/2010 | Otani et al. |

(Continued)

FOREIGN PATENT DOCUMENTS

| | | |
|---|---|---|
| JP | 2009128210 A | 6/2009 |
| JP | 2010190733 A | 9/2010 |

(Continued)

*Primary Examiner* — Shelley Chen
(74) *Attorney, Agent, or Firm* — Alleman Hall Creasman & Tuttle LLP

(57) ABSTRACT

A recognition timing estimation device configured to estimate a timing of a driver's recognizing action related to a subsequent travel segment of a plurality of travel segments that constitute a traveling course of a vehicle, is provided. The device includes a processor configured to execute a traveling information acquiring module to acquire information related to a driving operation of a driver or the traveling course, a travel segment estimating module to estimate a pause between the travel segments based on the information acquired by the traveling information acquiring module, an eye detecting module to detect a behavior of a driver's eye, and a recognition timing estimating module to estimate the timing of the driver's recognizing action based on a temporal relationship between the pause between the travel segments estimated by the travel segment estimating module and the behavior of the eye detected by the eye detecting module.

5 Claims, 5 Drawing Sheets

(56) References Cited

U.S. PATENT DOCUMENTS

| | | | |
|---|---|---|---|
| 2011/0298913 A1* | 12/2011 | Matsushima | A61B 5/18 348/78 |
| 2013/0116919 A1 | 5/2013 | Furuhata et al. | |
| 2014/0192325 A1* | 7/2014 | Klin | A61B 5/168 351/209 |
| 2018/0141570 A1 | 5/2018 | Kimura | |
| 2019/0255919 A1* | 8/2019 | Kishimoto | G02F 1/13 |
| 2019/0300002 A1 | 10/2019 | Fung et al. | |

FOREIGN PATENT DOCUMENTS

| | | | |
|---|---|---|---|
| JP | 2013250663 A | 12/2013 |
| JP | 2016045681 A | 4/2016 |
| WO | 2016166791 A | 10/2016 |

* cited by examiner

METHOD AND DEVICE FOR ESTIMATING RECOGNITION TIMING

TECHNICAL FIELD

The present disclosure relates to a recognition timing estimation device, and particularly to a method and device for estimating a timing of a driver's recognizing action based on a driving scene of a vehicle, in order to feed a driver information at a suitable timing.

BACKGROUND OF THE DISCLOSURE

JP2013-250663A discloses a driving scene recognition device. In this driving scene recognition device, information such as an operation by a driver and a behavior of a vehicle are detected and differentiation value information corresponding to differentiation values of the information are then detected. Further, based on the differentiation value information in addition to the information on the operation by the driver and the behavior of the vehicle, a symbol string corresponding to a state of the vehicle is generated, and a driving scene is recognized based on an order of driving words obtained by segmenting the symbol string. In addition, the driving scene recognition device disclosed in JP2013-250663A recognizes, for example, driving scenes in which the driver is about to start a lane change and the driver is about to park the vehicle based on the detected driver's driving operation and vehicle behavior. Further, in these recognized driving scenes, the driving is assisted by automatically displaying an image of the situation rearward of the destination lane or automatically turning on a parking assist system.

However, the driving scene recognition device disclosed in JP2013-250663A cannot estimate a pause (or boundary) of those driving scenes with sufficient accuracy, thereby causing a problem that the information cannot be fed to the driver at a suitable timing. That is, there is a large amount of information to be fed to the driver who is driving the vehicle, and if all of the information is displayed at once, the driver has to selectively recognize information that is necessary for the current driving situation out of the currently displayed information. Since the work in which the driver selectively recognizes the necessary information out of the large amount of information is very complicated and it may confuse the driver, the driver cannot fully utilize the information even if the information is illustrated.

SUMMARY OF THE DISCLOSURE

On the other hand, a driver can be enabled to easily recognize the displayed information by selectively displaying the necessary information out of the large amount of information at a suitable timing for a recognizing action by the driver, and thus, it becomes possible for the driver to fully utilize the information for a driving action.

Therefore, the present disclosure aims at providing a method of estimating a timing of the driver's recognizing action with sufficient accuracy in order to feed the driver the information at the suitable timing.

According to one aspect of the present disclosure, a recognition timing estimation device configured to estimate a timing of a driver's recognizing action related to a subsequent travel segment of a plurality of travel segments that constitute a traveling course of a vehicle is provided. The device includes a processor configured to execute a traveling information acquiring module to acquire information related to a driver's driving operation or the traveling course, a travel segment estimating module to estimate a pause between the travel segments based on the information acquired by the traveling information acquiring module, an eye detecting module to detect a behavior of a driver's eye, and a recognition timing estimating module to estimate the timing of the driver's recognizing action based on a temporal relationship between the pause between the travel segments estimated by the travel segment estimating module and the behavior of the eye detected by the eye detecting module.

According to this configuration, the traveling information acquiring module acquires the information related to the driver's driving operation or the traveling course, and based on the information, the travel segment estimating module estimates the pause between the travel segments. Meanwhile, the eye detecting module detects the behavior of the driver's eye. The recognition timing estimating module estimates the timing of the driver's recognizing action based on the temporal relationship between the pause between the travel segments estimated by the travel segment estimating module and the behavior of the eye detected by the eye detecting module.

The driver who drives the vehicle does not always pay constant attention to a surrounding traffic situation during the operation, but it is considered that he/she recognizes the traffic environment neighboring the vehicle slightly before the start of the driving action for one travel segment, and based on this recognition, forms a driving plan for the subsequent travel segment to perform the driving action. Therefore, by feeding appropriate information at a timing of the recognizing action of the driver which occurs around the pause between the travel segments during the operation, the driver can easily pay attention to the fed information and utilize the information sufficiently. However, according to the study of the present inventors, the recognizing action by the driver does not always appear for every pause, but the timing of the recognizing action differs depending on a driver's individuality, driving skills, etc. Thus, it is difficult to identify the timing of the recognizing action of the driver.

As a result of further study by the present inventors, it is revealed that the pause between the travel segments and a movement of eyes of the driver have a certain relationship when the driver performs the recognizing action. According to this configuration, since the recognition timing estimating module estimates the timing of the driver's recognizing action based on the temporal relationship between the pause between the travel segments estimated by the travel segment estimating module and the movement of the eye detected by the eye detecting module, the timing of the recognizing action of the driver can sufficiently accurately be estimated. Thus, it becomes possible to feed necessary information at a timing when the driver pays attention and the driver can utilize the fed information sufficiently.

When the eye detecting module detects more than a given quantity of movement of a line of sight or a blink of the driver's eye within a given time prior to the pause between the travel segments, the recognition timing estimating module may estimate that the driver's recognizing action occurs at the pause between the travel segments.

According to the study by the present inventors, it is revealed that the driver of the vehicle performs the recognizing action in order to comprehend the traffic situation of the subsequent travel segment immediately before transferring from the current travel segment to the subsequent travel segment, and continues the driving operation while forming the plan of the subsequent travel segment. It is also revealed that the driver moves the line of sight largely to some extent or blinks when he/she comprehends the traffic situation of the subsequent travel segment. According to this configuration, since when more than the given quantity of movement of the line of sight or the blink of the driver's eye within the given time prior to the pause between the travel segments is detected, it is estimated that the driver's recognizing action occurs at the pause between the travel segments, the recognizing action of the driver can accurately be estimated.

The information related to the subsequent travel segment may be displayed on a display at a given time before the pause between the travel segments.

According to this configuration, since the information related to the subsequent travel segment is displayed before the given time of the pause between the travel segments, the driver can acquire the information related to the subsequent travel segment suitably when performing the recognizing action, and effectively utilize the fed information. Thus, it becomes easy for the driver to form the driving plan of the subsequent travel segment, which reduces a burden on the driver.

The given time may be 0.5 to 1 second.

According to another aspect of the present disclosure, a method of estimating a timing of a driver's recognizing action related to a subsequent travel segment of a plurality of travel segments that constitute a traveling course of a vehicle, is provided. The method includes the steps of acquiring information related to a driver's driving operation or the traveling course, estimating a pause between the travel segments based on the acquired information, detecting behavior of a driver's eye, and estimating the timing of the driver's recognizing action based on a temporal relationship between the estimated pause between the travel segments and the detected behavior of the eye.

DETAILED DESCRIPTION OF THE DISCLOSURE

Figure 1:
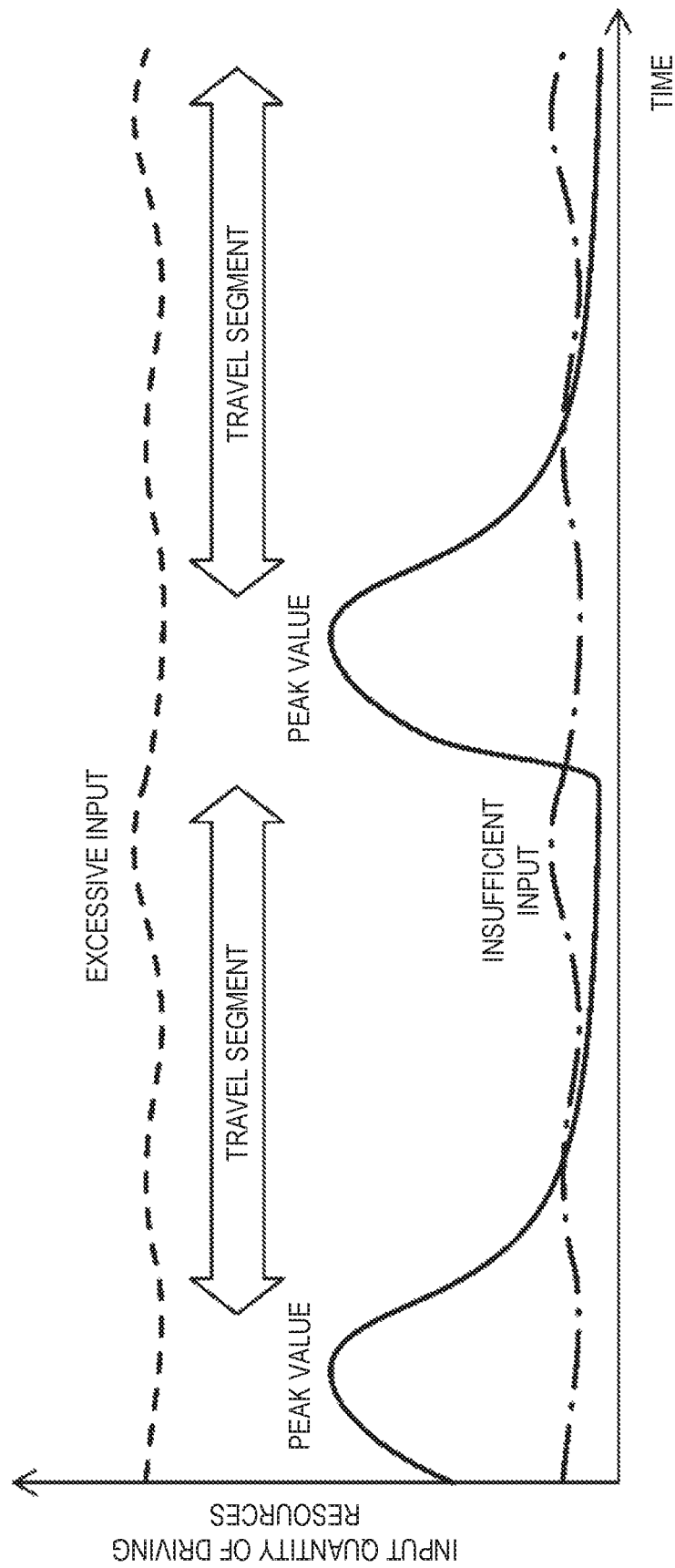
FIG. 1 is a view conceptually illustrating an input quantity of a driving resource of a driver who is driving a vehicle.

Hereinafter, a method and device for estimating a recognition timing according to one embodiment of the present disclosure are described with reference to the accompanying drawings. FIG. 1 is a view conceptually illustrating an input quantity of a driving resource of a driver who is driving a vehicle.

As illustrated by a solid line in FIG. 1, it is known that a driver who is skilled to some extent does not always use a constant quantity of his/her driving resources during operation of the vehicle, but intensively uses the driving resources at a necessary timing according to a travel segment, or otherwise, the input quantity of the driving resources decreases. That is, during operation of the vehicle, the driver forms a driving plan while foreseeing a traffic environment neighboring the vehicle to some extent, and after the driver drives the vehicle according to the driving plan, he/she continues the driving by repeating the action of foreseeing a further traffic environment. The driver's attention (driving resources) is intensively used when forming the driving plan, and the input quantity of the driving resources decreases when traveling according to the driving plan. Thus, when the driver forms the driving plan, he/she uses many driving resources to perform the recognizing actions, and intensively acquires the information related to the neighboring traffic environment for the subsequent travel segment. On the other hand, as illustrated by a dashed line in FIG. 1, an unskilled driver tends to always use the maximum quantity of driving resources, and thereby his/her fatigue may be increasingly accumulated if the driving continues for hours. Meanwhile, as illustrated by a one-dot chain line in FIG. 1, the driver who always does not have a sufficient usable quantity of driving resources may not be able to drive safely enough.

Thus, the driving resource to be used by the driver who is skilled to some extent has, during traveling, a peak value for every given pause between travel segments. However, the pause between the travel segments at which the peak value appears differs for every driver. This difference may be considered to depend on a driver's individuality, driving skills, a degree of experience to the currently-traveling course, etc. For example, it is thought that in a case of the driver with a high level of skill and the driver who drives a familiar traveling course, since he/she can instantly comprehend the neighboring traffic environment to a distant location, an interval at which the peak value of the driving resource appears is extended.

On the other hand, it is thought that, if the driving operation is assisted by feeding the driver the information related to the neighboring traffic environment, it is effective to feed the information at a timing at which the driver uses many driving resources to perform the recognizing action where he/she is about to collect the information related to the subsequent travel segment. By feeding the information related to the subsequent travel segment at the timing at which the driver performs the recognizing action to collect the information related to the subsequent travel segment, the driver can easily accept the information, thereby fully utilizing the information. The method and device for estimating the recognition timing of this embodiment aims at estimating with sufficient accuracy such a timing at which the driver uses many driving resources to perform the recognizing action.

Figure 2:
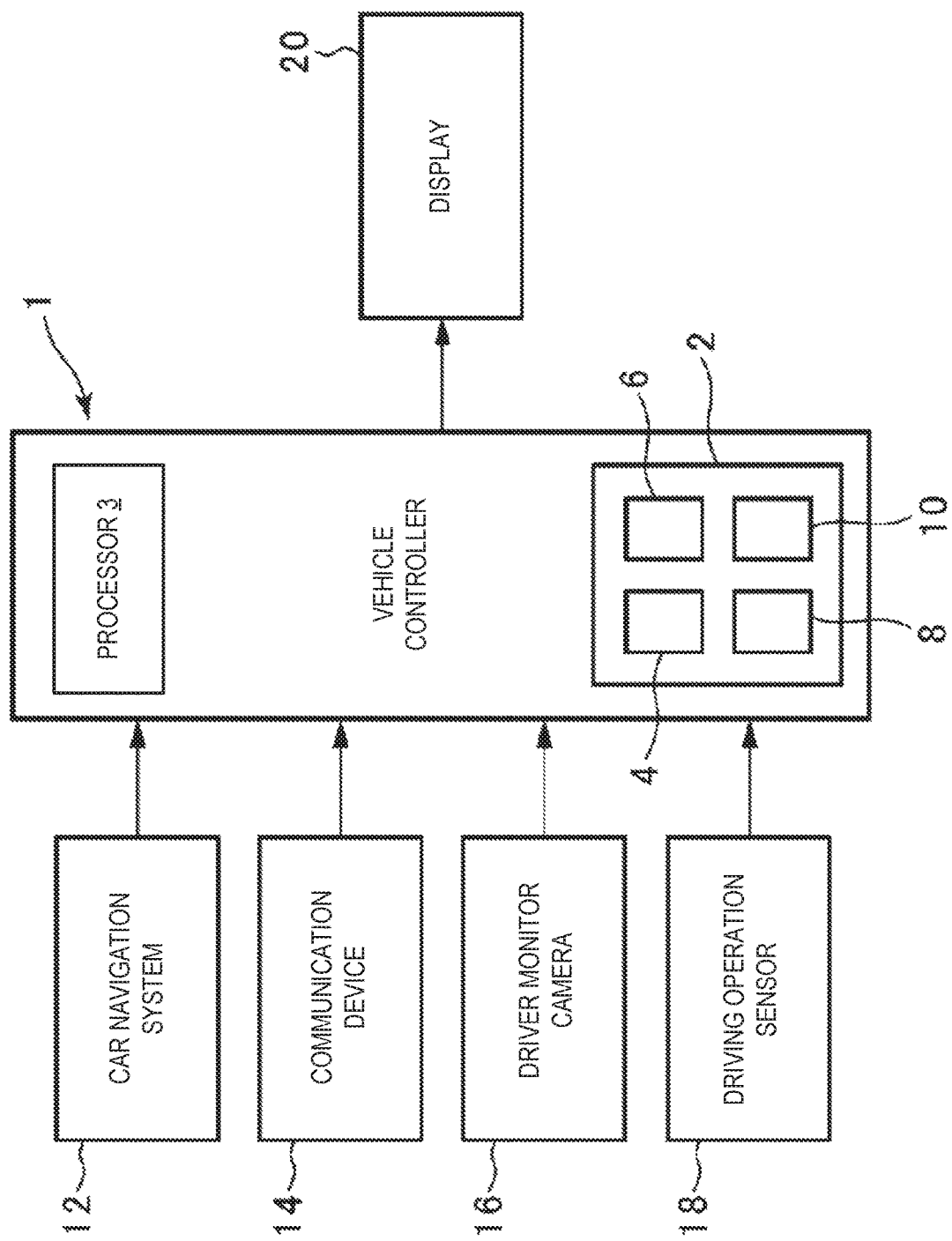
FIG. 2 is a block diagram schematically illustrating a configuration of a recognition timing estimation device according to one embodiment of the present disclosure.
Figure 3:
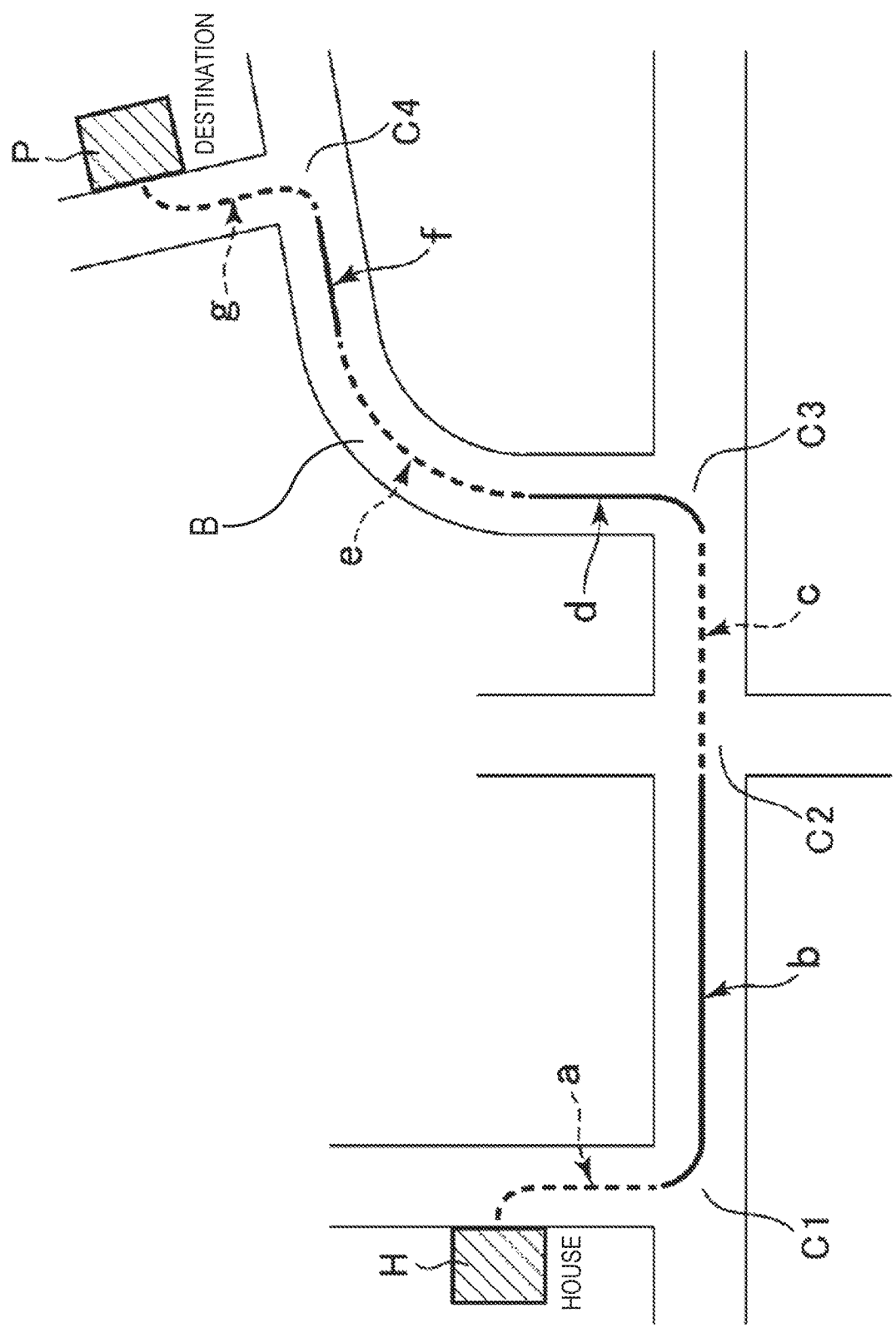
FIG. 3 is a view illustrating one example of a traveling course of the vehicle using the recognition timing estimation device according to the embodiment of the present disclosure.
Figure 4:
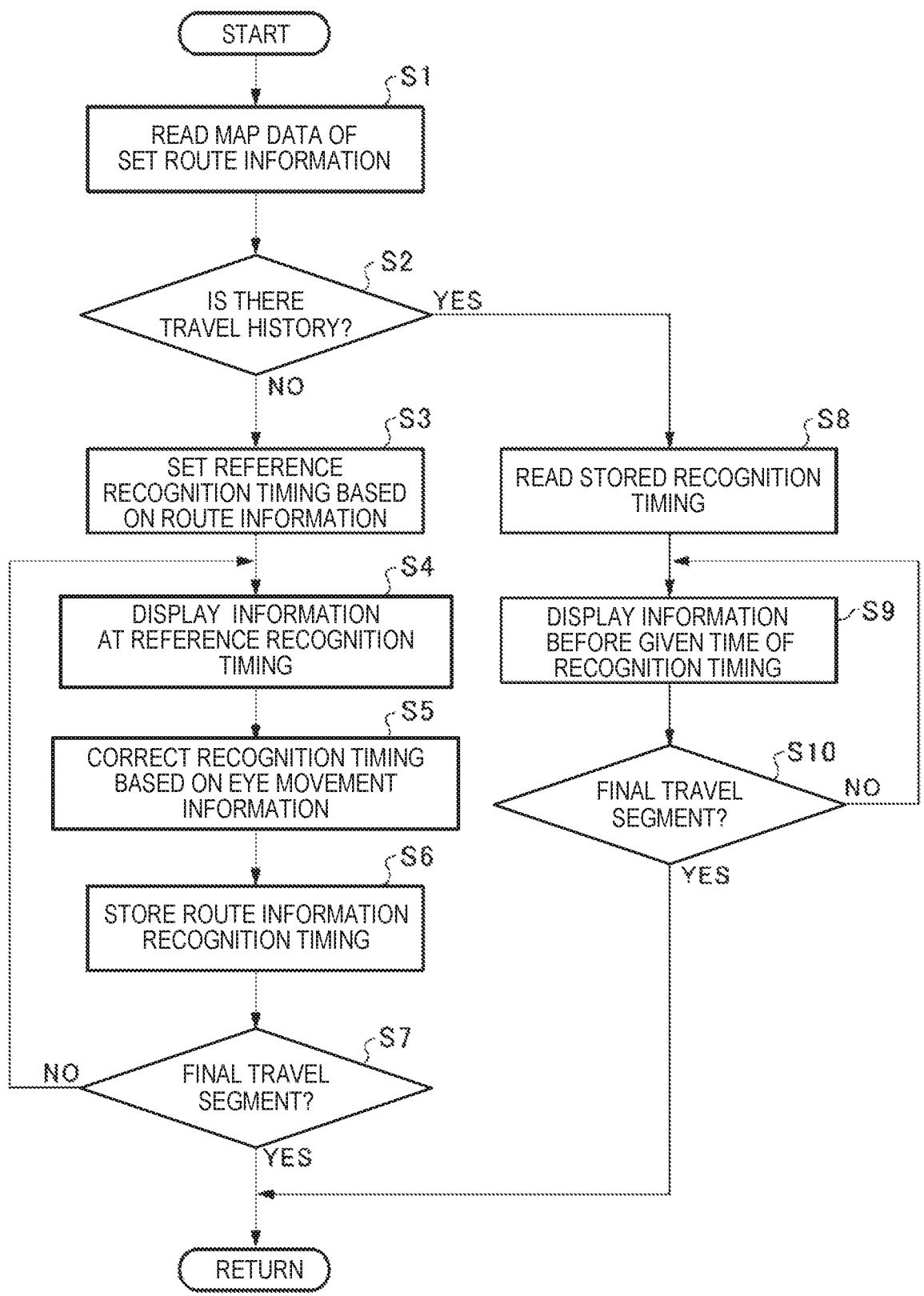
FIG. 4 is a flowchart illustrating processing by the recognition timing estimation device according to the embodiment of the present disclosure.
Figure 5:
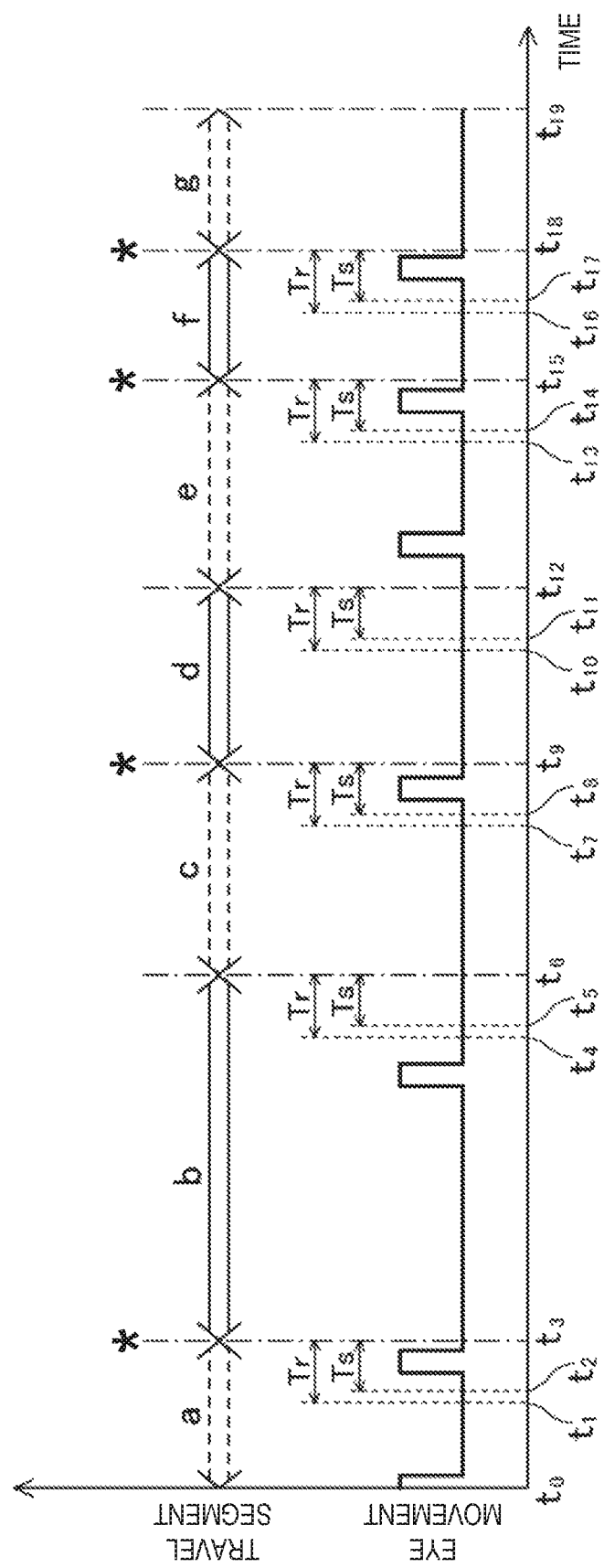
FIG. 5 is a view illustrating one example of timings of recognizing actions estimated in the traveling course illustrated in FIG. 3.

Next, referring to FIGS. 2 to 5, a configuration and operation of the method and device for estimating the recognition timing according to the embodiment of the present disclosure are described. FIG. 2 is a block diagram schematically illustrating the configuration of the recognition timing estimation device according to this embodiment of the present disclosure. FIG. 3 is a view illustrating one example of a traveling course where the vehicle travels using the recognition timing estimation device of this embodiment. FIG. 4 is a flowchart illustrating processing by the recognition timing estimation device of this embodiment. FIG. 5 is a view illustrating one example of the timing of the recognizing action estimated in the traveling course illustrated in FIG. 3.

As illustrated in FIG. 2, the recognition timing estimation device of this embodiment is incorporated in a vehicle controller 1 which is mounted to the vehicle. Although the vehicle controller 1 is typically comprised of a processor 3 (e.g., microprocessor), memory, an interface circuit, and software which operates these devices (none of them are illustrated), a recognition timing estimation device 2 is implemented in this embodiment as a part of the functions of these devices. Moreover, the recognition timing estimation device 2 is comprised of a traveling information acquiring module 4, a travel segment estimating module 6, a driver information detecting module (eye detecting module) 8, and a recognition timing estimating module 10, which are software modules stored in the memory and configured to be executed by the processor 3 to achieve the corresponding functions of each module.

Moreover, the vehicle controller 1 is connected to a car navigation system 12, a communication device 14, a driver monitor camera 16, a driving operation sensor 18, and a display 20 which is an information feed device. The car navigation system 12 is configured to send to the vehicle controller 1 map data around the vehicle and route information to a destination which is set by the driver, as navigation information.

The communication device 14 is configured to acquire information on other vehicles located around the vehicle by receiving electric waves from other vehicles which travel near the vehicle under operation and other vehicles which are parked or stopped nearby, by inter-vehicle communications in addition to transmission and reception of common electric waves, such as reception of electric waves from GPS satellites. The communication device 14 is also configured to acquire information on pedestrians who are around the vehicle by road-to-vehicle communications.

The driver monitor camera 16 is configured to image from the front the head, etc. of the driver who drives in a driver's seat of the vehicle. The vehicle controller 1 performs an image analysis of the image data sent from the driver monitor camera 16 to detect a driver's condition.

The driving operation sensor 18 is a sensor configured to detect an operation of the driver to the vehicle, and is comprised of a steering angle sensor, an accelerator pedal sensor, and a brake pedal sensor. Signals from the sensors are inputted into the vehicle controller 1, and the vehicle controller 1 then analyzes the driving operation of the vehicle by the driver.

The display 20 is a display device disposed at a position where it is visible from the driver while being seated in the driver's seat, and is configured to display information to be fed to the driver. Alternatively, the display 20 may constitute a part of the car navigation system 12, or may also serve as an information input device by being provided with a touch panel.

Next, operation of the recognition timing estimation device 2 according to this embodiment is described with reference to FIGS. 3 to 5. First, as illustrated in FIG. 3, the driver who is in a house H uses the car navigation system 12 to input a traveling course to a destination P. The information related to the inputted traveling course is acquired by the traveling information acquiring module 4 provided to the recognition timing estimation device 2.

The travel segment estimating module 6 provided to the recognition timing estimation device 2 then estimates a pause between travel segments of the vehicle based on the information acquired by the traveling information acquiring module 4. In one example illustrated in FIG. 3, the travel segment estimating module 6 extracts seven travel segments comprised of a travel segment "a" from the house H to a T-junction C1 where the vehicle turns left, a travel segment "b" from the T-junction C1 to a crossing C2 through which the vehicle passes, a travel segment "c" from the crossing C2 to a T-junction C3 where the vehicle turns left, a travel segment "d" from the T-junction C3 to a start position of a curve B, a travel segment "e" from the start position to an end position of the curve B, a travel segment "f" from the end position of the curve B to a T-junction C4 where the vehicle turns left, and a travel segment "g" from the T-junction C4 to the destination P. However, there is an individual difference among the travel segments (a series of driving operations) of which a driver is conscious, and all drivers do not always perform the recognizing action just before transitioning to each travel segment extracted by the travel segment estimating module 6 and form a driving plan.

Next, operation of the recognition timing estimation device 2 according to this embodiment when the vehicle travels along the traveling course of FIG. 3, and the method of estimating the recognition timing, are described with reference to FIGS. 4 and 5.

First, when the driver operates the car navigation system 12 provided to the vehicle to set the traveling course (destination) illustrated in FIG. 3, the map data of the set traveling course is acquired by the traveling information acquiring module 4 of the recognition timing estimation device 2 at Step S1 of FIG. 4 (a traveling information acquiring step).

Next, at Step S2, the recognition timing estimation device 2 determines whether the traveling course which has been set by the driver can be found in the past travel history. If there is no travel history, it transits to Step S3, and on the other hand, if there is the travel history, it transits to Step S8.

If there is no past travel history, at Step S3, the travel segment estimating module 6 of the recognition timing estimation device 2 estimates a pause between the travel segments based on the traveling course (a travel segment estimating step). In the example illustrated in FIG. 3, the travel segment estimating module 6 estimates the travel segments a to g described above based on the traveling course. The travel segment estimating module 6 also sets a time point before a given period of time from the time point at which the travel segment is assumed to transition from a certain travel segment to a subsequent travel segment, as a reference recognition timing at which the driver is to perform the recognizing action. Thus, if the vehicle travels the course which cannot be found in the past travel history, the timing at which the driver may perform the recognizing action is temporarily set as the reference recognition timing. Preferably, the reference recognition timing is set at a time point about 1.5 to 1 second before the time point at which the travel segment is assumed to transition.

That is, as shown by dashed lines in FIG. 5, the travel segment estimating module 6 sets pauses between the travel segments a to g in the traveling course as time points t3, t6, t9, t12, t15, and t18 in FIG. 5, and temporarily sets time points before a given recognition preparation time Tr from such time points as the reference recognition timings t1, t4, t7, t10, t13, and t16, respectively.

Next, when the driver starts driving the vehicle, the driver monitor camera 16 mounted to the vehicle images an image of the driver's head at a given time interval (a driver information detecting step). The imaged data is sequentially sent to the vehicle controller 1, and the driver information detecting module 8 of the recognition timing estimation device 2 performs the image analysis of the image data to detect a movement of a driver's line of sight and the existence of a driver's eye blink. When the movement of the line of sight which is a motion of the driver's eyes is detected to be more than a given quantity or the blink is detected by the image analysis, the driver information detecting module 8 generates a given pulse signal as illustrated in a lower row of FIG. 5. Note that the movement of the driver's line of sight includes a movement of the eyes by the driver moving the eyeballs, and a movement of the eyes by the driver moving the head. Note that the detection of the driver's line of sight and/or the blink may be detected based on one or both of the driver's eyes.

In the example illustrated in FIG. 5, the movement of the driver's eyes is detected and the pulse signal is generated between the time points t2 and t3, between the time points t3 and t4, etc.

Further, when the driver causes the vehicle to travel and it becomes the time point t1 which is before the given recognition preparation time Tr (about 1 to 1.5 second) of the time point t3 at which the travel segment is assumed to transit from the travel segment a to the travel segment b, the recognition timing estimation device 2 sends a signal to the display 20 to display information corresponding to the travel segment b which is the subsequent travel segment (Step S4 of FIG. 4). Note that the transition time point from the travel segment a to the travel segment b can be estimated based on positional information on the vehicle obtained through the car navigation system 12, and a traveling speed of the vehicle. Thus, the information corresponding to the subsequent travel segment is displayed before the recognition preparation time Tr of the estimated time point.

Here, the information corresponding to the travel segment b includes information on other vehicles currently parked or stopped in a travel segment where the vehicle is planned to travel in the travel segment b, information of pedestrians, and information on road repair currently conducted in the travel segment. These pieces of information can be acquired from the communication device 14 through the inter-vehicle communications or the road-to-vehicle communications, and can be acquired through the car navigation system 12. Note that the information corresponding to the subsequent travel segment which is thus displayed on the display 20 is information related to the traveling of the vehicle, and does not include information related to tastes or preferences of the driver or other persons on board, such as information related to restaurants and convenience stores located along the road.

Next, at Step S5 of FIG. 4, it is estimated whether the driver is performing the recognizing action at the pause between the travel segment a and the travel segment b based on the output signals of the driver information detecting module 8. That is, the recognition timing estimating module 10 of the recognition timing estimation device 2 estimates the timing of the driver's recognizing action based on a temporal relationship between the pause between the travel segments estimated by the travel segment estimating module 6, and the movement of the driver's eyes detected by the driver information detecting module 8 (a recognition timing estimating step).

In this embodiment, when the movement of the driver's eyes is detected by the driver information detecting module 8 within a given recognizing action time Ts before the time point of the pause between the travel segments estimated by the travel segment estimating module 6, it is estimated that the driver's recognizing action is performed at the pause between the travel segments. Preferably, the given recognizing action time Ts is set to about 0.5 to 1 second, which is shorter than the recognition preparation time Tr.

In the example illustrated in FIG. 5, since the movement of the driver's eyes is detected by the driver information detecting module 8 within the given recognizing action time Ts before the time point t3 (between the time points t2 and t3), it is presumed that the driver's recognizing action is performed at the pause between the travel segment a and the travel segment b. Subsequently, at Step S6 of FIG. 4, it is stored that the driver performed the recognizing action at the pause between the travel segment a and the travel segment b.

Further, at Step S7, the recognition timing estimation device 2 determines whether the pause between the travel segments processed at Step S6 is related to the final travel segment estimated by the travel segment estimating module 6. If the travel segment is final, the first round of the processing of the flowchart illustrated in FIG. 4 is finished. On the other hand, if it is not the final travel segment, the recognition timing estimation device 2 returns to Step S4 where processing related to the subsequent reference recognition timing set at Step S3 is performed. Thus, the processing will similarly be repeated until it reaches the final travel segment of the set traveling course.

In the example illustrated in FIG. 5, the information corresponding to the travel segment c which is the subsequent travel segment is displayed at the time point t4 which is before the recognition preparation time Tr from the time point t6 of the pause between the travel segment b and the travel segment c. However, since the movement of the driver's eyes is not detected by the driver information detecting module 8 within the recognizing action time Ts before the time point t6 (between the time points t5 and t6), it is presumed that the driver's recognizing action is not performed at the pause between the travel segment b and the travel segment c. That is, in the example illustrated in FIG. 5, it is considered that the driver is conscious of the travel segment b and the travel segment c which are estimated by the travel segment estimating module 6 as a single travel segment, and a recognizing action related to the travel segment c is also performed just before transitioning to the travel segment b.

Note that in the travel segment b, although the movement of the driver's eyes is detected between the time points t3 and t4, the recognition timing estimation device 2 determines that the recognizing action is not performed by the driver because this movement of the driver's eyes is not performed near (just before) the pause between the travel segments. Thus, any movement of eyes and blinking which are not related to the recognizing action, such as driver's looking aside, can be eliminated by presuming the existence of the driver's recognizing action based on the relation between the movement of the driver's eyes and the pauses between the travel segments.

Similarly, it is estimated that the driver's recognizing action is performed at the time point t9 of the pause between the travel segment c and the travel segment d, at the time point t12 of the pause between the travel segment d and the travel segment e, at the time point t15 of the pause between the travel segment e and the travel segment f, and at the time point t18 of the pause between the travel segment f and the travel segment g. Thus, as illustrated in FIG. 5, the recognition timing estimation device 2 estimates that the driver performs the recognizing action just before each pause between the travel segments in the traveling course between the house H and the destination P illustrated in FIG. 3, where each pause is marked by an asterisk (*), and this is stored in the memory (not illustrated) of the vehicle controller 1.

On the other hand, at Step S2 of the flowchart illustrated in FIG. 4, if the recognition timing estimation device 2 determines that there is the travel history of the set traveling course, it transits to Step S8. At Step S8, a timing of the recognizing action by the driver, which is stored when the vehicle traveled the same traveling course before is read from the memory.

Next, at Step S9, the information corresponding to the subsequent travel segment is displayed on the display 20 before the recognition preparation time Tr of the pause (marked by an asterisk (*) in FIG. 5) of the travel segment of which the driver is aware. In the example illustrated in FIG. 5, the information related to the travel segments b and c which is recognized to be the single travel segment by the driver is displayed on the display 20 at the time point t1 before the recognition preparation time Tr of the pause (time point t3) between the travel segment a and the travel segment b of which the driver is aware. It is considered that the driver performs the recognizing actions for the travel segments b and c about the time point t1 to form the driving plan therebetween. Thus, the driver can timely acquire the information corresponding to the subsequent travel segment, and can fully utilize the information displayed on the display 20.

Note that the time point of the pause between respective travel segments in the processing executed at Step S8 and subsequent steps of the flowchart illustrated in FIG. 4 is a time point at which the currently-traveling vehicle is estimated to reach the pause, and will not become the same as the time point in the processing at Step S3 and subsequent steps performed before.

On the other hand, since it is stored that the driver performed no recognizing action at the pause between the travel segment b and the travel segment c (time point t6), displaying of the information on the display 20 is not performed at the time point t4 before that. After that, the recognition timing estimation device 2 displays the information corresponding to the travel segments d and e at the time point t7, the information corresponding to the travel segment f at the time point t13, and the information corresponding to the travel segment g at the time point t16, and one round of the processing of the flowchart illustrated in FIG. 4 is finished.

According to the recognition timing estimation device 2 of this embodiment, since the recognition timing estimating module 10 estimates the timing of the driver's recognizing action based on the pause between the travel segments (FIG. 3) estimated by the travel segment estimating module 6 (pause marked by an asterisk (*) in FIG. 5), and the movement of the driver's eyes detected by the driver information detecting module 8, the timing of the driver's recognizing action can be estimated with sufficient accuracy. Thus, the necessary information can be fed at the timing at which the driver directs his/her attention, and the driver can fully utilize the displayed information.

Moreover, according to the recognition timing estimation device 2 of this embodiment, when more than the given quantity of the movement of the driver's line of sight, or the blink is detected within the given time (Ts) before the time points (t3, t6, t9, t12, t15 and t18 of FIG. 5) at which the pauses between the travel segments are estimated. Therefore, the recognition timing estimation device 2 estimates that the driver's recognizing action is performed at the pauses of the travel segments (t3, t9, t15 and t18 of FIG. 5), and the driver's recognizing action can accurately be estimated.

Further, according to the recognition timing estimation device 2 of this embodiment, since the information corresponding to the subsequent travel segment is fed before the given time (Tr) of the pauses (the time points t3, t9, t15 and t18 of FIG. 5) of the travel segments at which the recognizing action is estimated to be performed, when the driver performs recognizing action, he/she can timely acquire the information related to the subsequent travel segment, thereby effectively utilizing the fed information.

As described above, although a preferable embodiment of the present disclosure is described, various change can be made to this embodiment. Particularly, although in the above embodiment the traveling information acquiring module acquires the traveling course inputted into the car navigation system and the travel segment estimating module estimates the pause between the travel segments based on the acquired information, the present disclosure may also be configured so that the traveling information acquiring module acquires information related to the driving operation sensor. That is, the present disclosure may also be configured so that the traveling information acquiring module acquires the detection data from the driving operation sensors, such as the steering angle sensor and the accelerator pedal sensor, and the travel segment estimating module estimates the pause between the travel segments based on the acquired data. Alternatively, the present disclosure may also be configured so that the pause between the travel segments is estimated using both the information on the traveling course and the information on the driving operation sensor which are inputted.

Moreover, although in the above embodiment the display is provided as the information feed device and the information corresponding to the subsequent travel segment is displayed on the display, the present disclosure may also be configured so that a voice generating device, such as a speaker, is provided as the information feed device. Further, although in the above embodiment all the functions of the recognition timing estimation device is implemented by the microprocessor, etc. of the vehicle controller mounted to the vehicle, the present disclosure may also be configured so that at least some of the functions of the recognition timing estimation device is executed on a server which is communicable of information with the vehicle controller.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle Controller
2 Recognition Timing Estimation Device
4 Traveling Information Acquiring Module
6 Travel Segment Estimating Module
8 Driver Information Detecting Module
10 Recognition Timing Estimating Module
12 Car Navigation System
14 Communication Device
16 Driver Monitor Camera
18 Driving Operation Sensor
20 Display (Information Feed Device)

What is claimed is:

1. A recognition timing estimation device configured to estimate a timing of a driver's recognizing action related to a subsequent travel segment of a plurality of travel segments that constitute a traveling course of a vehicle, comprising:
  a processor configured to execute:
    a traveling information acquiring module to acquire information related to a driving operation of the driver or the traveling course;
    a travel segment estimating module to estimate a pause between the travel segments based on the information acquired by the traveling information acquiring module;
    an eye detecting module to detect a behavior of a driver's eye; and
    a recognition timing estimating module to estimate the timing of the driver's recognizing action based on a temporal relationship between the pause between the travel segments estimated by the travel segment estimating module and the behavior of the eye detected by the eye detecting module.

2. The recognition timing estimation device of claim 1, wherein when the eye detecting module detects more than a given quantity of movement of a line of sight or a blink of the driver's eye within a given time prior to the pause between the travel segments, the recognition timing estimating module estimates that the driver's recognizing action occurs at the pause between the travel segments.

3. The recognition timing estimation device of claim 2, wherein the information related to the subsequent travel segment is displayed on a display at a given time before the pause between the travel segments.

4. The recognition timing estimation device of claim 3, wherein the given time is 0.5 to 1 second.

5. A method of estimating a timing of a driver's recognizing action related to a subsequent travel segment of a plurality of travel segments that constitute a traveling course of a vehicle, comprising the steps of:
  acquiring information related to a driving operation of a driver or the traveling course;
  estimating a pause between the travel segments based on the acquired information;
  detecting a behavior of a driver's eye; and
  estimating the timing of the driver's recognizing action based on a temporal relationship between the estimated pause between the travel segments and the detected behavior of the eye.

* * * * *